United States Patent [19]

Feight et al.

[11] Patent Number: 4,682,779
[45] Date of Patent: Jul. 28, 1987

[54] EXPLOSIVELY DRIVEN LATCH/SEAL DEVICE

[76] Inventors: Robert A. Feight, 22331 Covello St.; Vance W. Jaqua, 6916 Shoup Ave., both of Canoga Park, Calif. 91303; Joseph Trom, Jr., 63 N. Locust Ave., Agoura, Calif. 91301

[21] Appl. No.: 639,556

[22] Filed: Aug. 10, 1984

[51] Int. Cl.[4] .................. B23K 31/02; F16J 15/46; F16L 39/00
[52] U.S. Cl. .................................................. 277/34.3
[58] Field of Search .................... 29/421 E, 517; 285/382.2, 382; 277/34, 34.3

[56] References Cited

U.S. PATENT DOCUMENTS

| | | | |
|---|---|---|---|
| 3,377,694 | 4/1968 | Simons et al. | 29/421 |
| 3,560,030 | 2/1971 | Macks et al. | 285/382 |
| 3,672,035 | 6/1972 | Lieberman | 29/421 E |
| 3,712,022 | 1/1973 | Erlandson | 29/421 E |
| 3,717,352 | 2/1973 | Jansing | 277/34.3 |
| 4,111,470 | 9/1978 | Welcker | 285/382 |
| 4,357,990 | 11/1982 | Melnyk | 285/382 |
| 4,401,306 | 8/1983 | Arnold | 277/34.3 |
| 4,498,222 | 2/1985 | Ono | 29/517 |

Primary Examiner—Robert I. Smith

[57] ABSTRACT

An explosively driven latch-and-seal device for latching and sealing the ends of two telescoping members, such as a fixed nozzle section 14 and an extendible nozzle section 16 of a rocket engine. The forward end of the extendible nozzle 16 is formed with an axially extending flange 24. The rear end of the fixed nozzle 14 is formed with a radially extending projection 18 which has a recess 20 in its outer surface adjacent to the extendible nozzle flange 24. An explosively expandable tube (EET) 30 containing a mild detonating fuse (MDF) 32 is placed in contact with the flange 24 in such position with relation to the recess 20 that, when the MDF 32 is detonated, it expands to force the flange section in contact with it into the recess 20. A seal is formed between the deformed section of the flange 24 and the wall of the recess 20.

16 Claims, 6 Drawing Figures

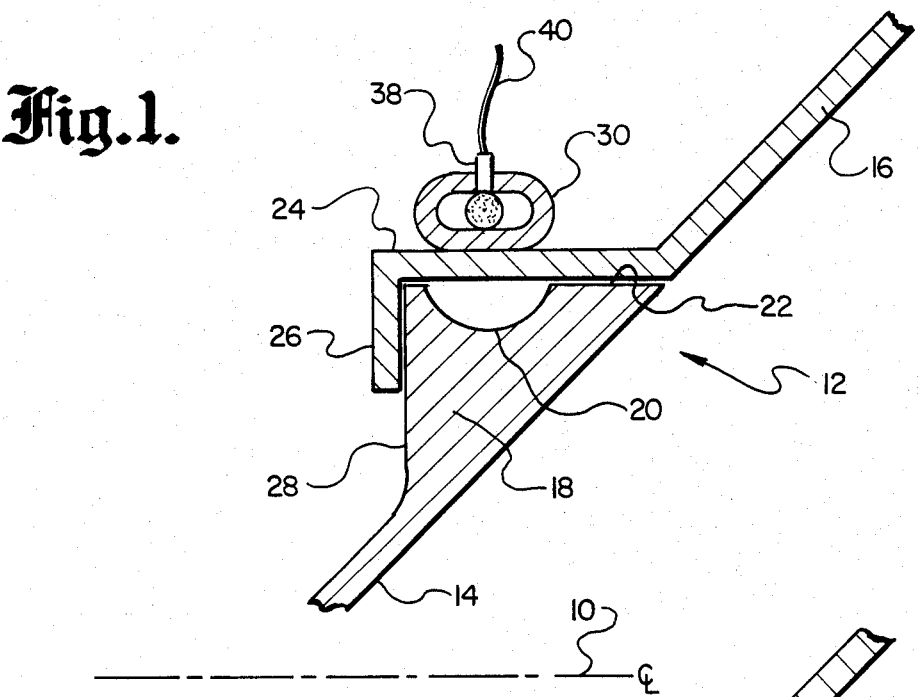
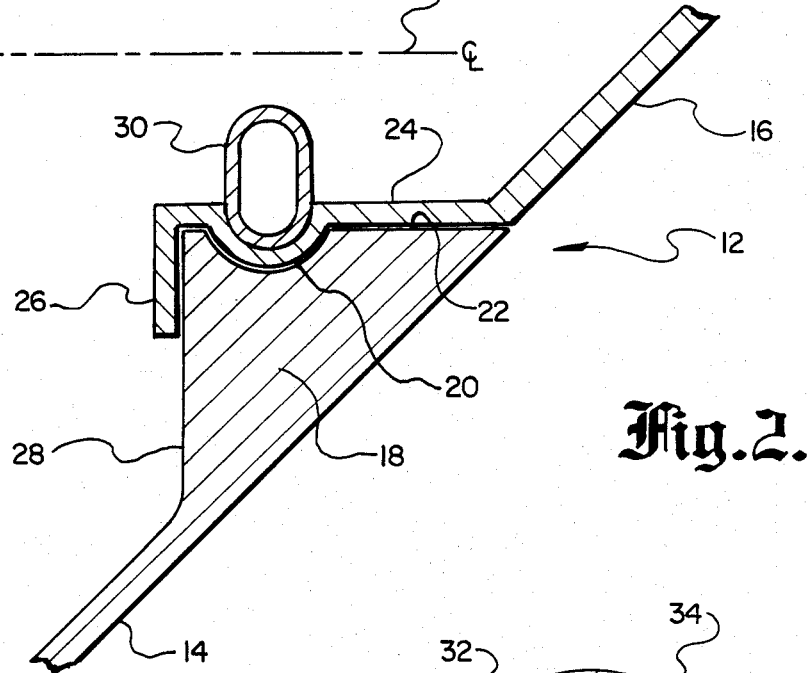
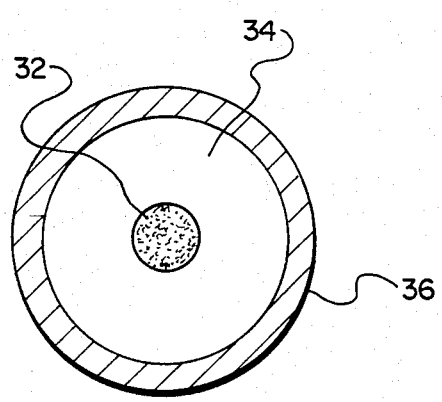

4,682,779

EXPLOSIVELY DRIVEN LATCH/SEAL DEVICE

BACKGROUND OF THE INVENTION

1. Field of the Invention

This invention relates to a latch/seal device and especially to an explosively driven latch-and-seal device.

2. Description of the Prior Art

Rocket engines for space-station, orbital-transfer vehicles and for earth-orbiting satellites, for example, have length limitations since the storage space inside the carriers which project them into outer space is limited. One method of decreasing the length of the overall vehicle is to decrease the nozzle length of the rocket engine which propels the upper stage vehicle. However, the nozzle performance is proportional in part to the expansion ratio which, in turn, controls the nozzle length and diameter, and it is generally desirable to have a long nozzle for good nozzle performance and a short nozzle to conform to storage-space limitations. The solution to this problem is to form the nozzle in at least two telescoping sections, a fixed section and an extendible section, the latter being extended only after the upper stage vehicle has been deployed from its carrier.

However, when fully extended, it is necessary to lock the two sections together and to form a seal between them so that the hot engine gases cannot escape except through the open exit portion of the extendible nozzle. If gases escape through holes in the seal, the hole can be eroded and enlarged by the hot gases and engine thrust is decreased and misdirected.

OBJECTS OF THE INVENTION

An object of the invention is to seal and latch the juncture between adjacent sections of two telescoping members after they have been placed in full extension, especially where the telescoping members are a fixed and an extendible nozzle section of a rocket engine.

Another object is to seal two separate members by explosive means.

Other objects, advantages and novel features of the present invention will become apparent from the following detailed description of the invention when considered in conjunction with the accompanying drawing.

SUMMARY OF THE INVENTION

The invention consists of pair of disparate adjacent members, the first being formed with a recess adjacent to the second. An explosively expandable tube (EET) is affixed to the second member so that the EET is in line with the recess, with the second member lying between the recess and the EET. When the explosive within the EET is detonated, the EET expands, deforming the second member and forcing it into sealing and latching contact with the wall of the recess. An especially useful application for this invention is for sealing and latching the ends of two telescoping members such as the ends of a fixed and an extendible nozzle section of a rocket engine.

In a second type of embodiment of the invention, the EET is placed between the recess and the second member, so that the metal of the EET container forms a seal with both the recess and the adjacent section of the second member after the explosive has expanded the EET container.

BRIEF DESCRIPTION OF THE DRAWINGS

FIG. 1 is a cross-sectional view of a preferred embodiment of the invention.

FIG. 2 is a cross-sectional view showing the formation of the seal in the embodiment of FIG. 1.

FIG. 3 is a cross-sectional view of the mild detonating fuse which can be used as an explosive device in the invention.

The same elements or parts throughout the figures of the drawings are designated by the same reference characters.

DETAILED DESCRIPTION OF THE PREFERRED EMBODIMENTS

Figure 4:
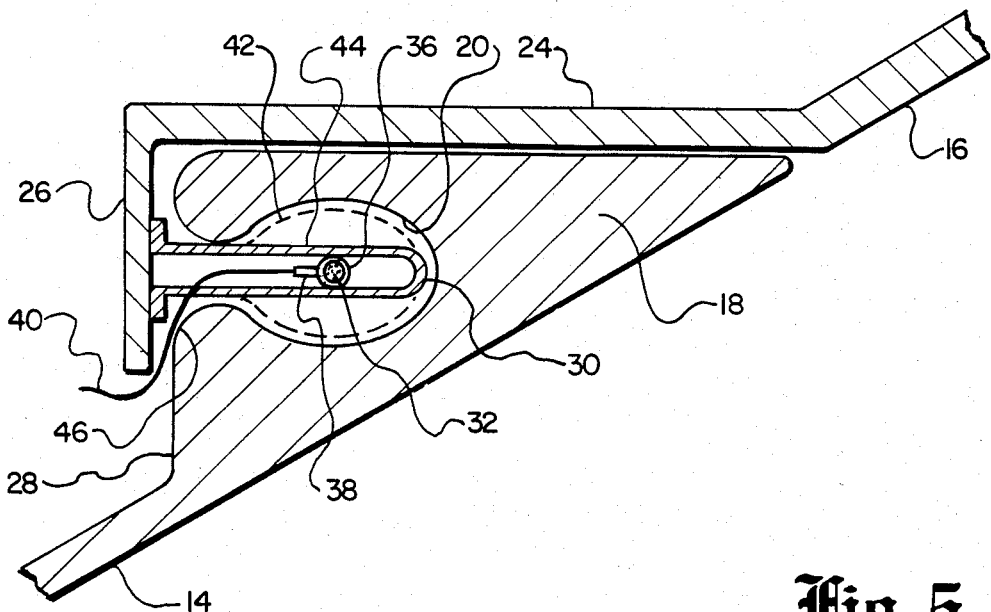
FIG. 4 is a cross-sectional view of a second embodiment of the invention.

A preferred form of the invention is shown schematically in FIG. 1 in relation to a latch and seal between the independent sections of a nozzle for a rocket engine. The centerline (CL) 10 of a rocket engine is shown, a section through the nozzle 12 being taken. It should be noted that FIG. 1 is incomplete in that a similar, but complementary, section of the nozzle 12 should be shown below the centerline 10, i.e., the nozzle 12 actually encircles the centerline 10. Also, the forward (toward the rocket engine, which is not shown) end of the fixed nozzle 14 and the rear (exhaust, or exit) end of the extendible nozzle 16 are shown broken away.

The rear end of the fixed nozzle 14 is formed with an outwardly protruding annular projection 18 which, in turn, is formed with an arcuate recess 20 in its outer surface 22. The recess 20 may have any desired cross-section, such as the arcuate shape which is depicted or a rectangular shape, for example. The forward end of the extendible nozzle 16 is formed with an axially extending, annular flange 24, the inward surface of which is shaped complementarily to the outersurface 22 of the front end of the extendible nozzle 16, exept that the flange 24 has no recess. An inwardly extending annular shoulder 2 is formed at the forward edge of the flange 24. The shoulder 26 is designed to make contact with the forward end 28 of the outwardly protruding section 18 of the fixed nozzle 14.

A flattened oval tube 30, known as the explosively expandable tube (EET), is affixed to the outer surface of the flange 24 by any suitable means, such as a suitable adhesive or spot welding. The EET 30 contains within it, as seen in cross-section, a circle of metal-clad explosive 32 (see Fig.3), which may, for example, be Hexanitrostibene, Grade A, Type II, surrounded by a spacer 34, for example, silicone rubber, both the explosive 32 and the spacer 34 beign enclosed in a thin circular container 36 of a metal, such as stainless steel, or columbium. The EET 30 and its contents are actually annular and extend peripherally around the extendible nozzle.

The metal-cladded explosive member 32 may be the commercial product known as a mild detonating fuse which comes in lengths and is called MDF.

At one point, at least, the EET 30 is formed with a hole into which a detonator 38 is lowered to place it in close proximity to the container 36. Wires 40 to a source of electricity extend from the electrically initiated detonator cap 38. Detonating means other than electrical, such as thermic means, may be employed.

After the extendible nozzle 16 is extended to its final rearward position, as shown in FIGS. 1 and 2, electricity is applied to the detonator 38. The detonation initiates the explosive in the MDF 32 and expands the oval tube 30 into a circle or an oval flattened in a direction perpendicular to its previous direction of flattening. The expansion of the EET 30 deforms the section of the flange 24 which is beneath the EET 30 and drives it into the recess 20 where it forms a tight fit with the surface of the recess 20, as indicated in FIG. 2. If the explosive is sized correctly and the surfaces shaped correctly, a weld can be formed between the recess surface and the now-curved surface of the flange 24. The effect of the explosion is to tightly latch and seal together the ends of the fixed and extendible nozzles.

A second embodiment of the invention is shown in FIG. 4. Here, a recess 20 is formed inside the annular section 18 of the fixed nozzle 14 with a channel opening 46 through the forward wall 28 of the annular projection 18. The EET 44 in this case is formed as an rearwardly directed, hollow, flattened annular flange which is fastened to the rear wall of the shoulder 26 by any suitable means. The EET 30 holds the MDF 32 and at least one detonator 38 within it, wires 40 extending from the detonator 38 through the annular projection 18 to an external source of electricity. When the MDF 32 is exploded, the EET 44 expands into a tight fit with the wall of the recess 20, as indicated by the dashed lines 42.

Figure 5:
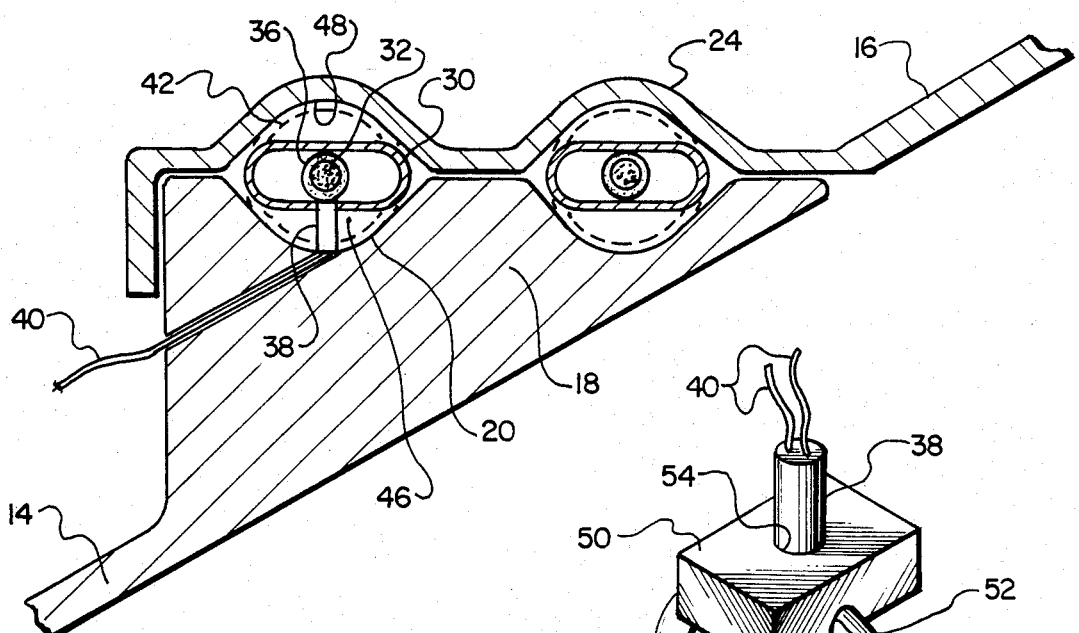
FIG. 5 is a cross-sectional view of a third embodiment of the invention.

A third embodiment of the invention is illustrated in FIG. 5. Here, at least one recess 20, which may be arcuate as shown, for example, is formed in the outer surface 22 of the outwardly protruding annular projection 18 of the fixed nozzle 14. The EET 30 is placed so as to span the diametral region of the recess 20 leaving a space 46 between the wall of the recess 20 and the outer wall of the EET 30. The EET 30 may be affixed to the outer surface of the projection 18. When the detonator 38 is energized, the explosion expands the wall of the EET 30 and a tight fit is formed with the wall of the recess 20 and with the inner surface of the annular flange 24 of the extendible nozzle 16. The annular flange 24 may originally be flat or formed with a concavity 48 into which the EET 30 expands. If it is flat, the explosion will form a concavity 48.

It should be noted that the shell forming the EET 30 should be reasonably ductile and strong enough to be structurally sound after the explosion forms the latch and seal. Thus, in FIGS. 4 and 5 in which the EET shell forms the seal between the fixed and extendible nozzle sections, the EET shell may be columbium or stainless steel, for example, or perhaps a moder fiber or plastic material. In FIG. 1 and 2, the annular flange 24 should also be a reasonably ductile and strong material, such as columbium, since the latch and seal is formed by the flange 24 and the recess 20 of the annular projection 18 of the fixed nozzle 14.

Figure 6:
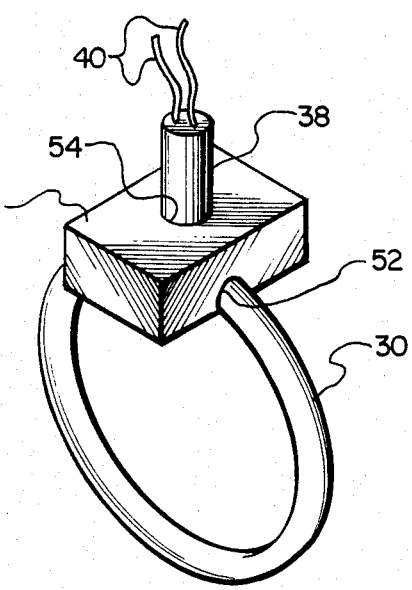
FIG. 6 is a schematic diagram showing a block arrangement for holding the ends of the EET and a detonator.

The EET 30 is formed into the shape of an unclosed circle and its ends may be held together by any suitable device. A convenient device, as shown in FIG. 6, may be a block 50 having a bore 52 along its bottom surface and a hold 54 in its top surface connecting with the bore 52. The detonator 38 may be set into the hole 54 so that it rests in close proximity with the EET 30 and will initiate it when the detonator 38 explodes.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. Means for latching and sealing the forward end of an extendible, mating, section and the rear end of an associated, fixed, mating section after full extension of the extendible section comprising:
   an axially extending flange affixed to the front end of the extendible section and having an inner surface;
   a radially extending projection affixed to the rear end of the fixed section and having an outer surface adjacent to the inner surface of the extendible section, said projection being formed with a recess therein opening inward from said outer surface;
   a deformable member in close proximity to the recess, said member defining a container;
   explosive means contained within said deformable member; and
   means for detonating said explosive means to expand the deformable member, the expansion causing a seal to occur between the flange and the projection whereby the two are locked together and sealed in the recess area.

2. Means as in claim 1, wherein:
   said flange is located between said deformable member and said recess.

3. Means as in claim 1, wherein:
   said deformable member is located between said recess and said flange.

4. Latch-and-seal means, for two telescoping annular objects, one extendible and one fixed, for latching and sealing the front end of the extendible object to the rear end of the fixed object, comprising:
   an axially extending annular flange affixed to the front end of the extendible object and having a inner surface;
   a radially extending, annular projection affixed to the rear end of the fixed object and having a outer surface adjacent to the inner surface of the extendible object, said projection being formed with a recess therein extending inward from said outer surface;
   a deformable member in close proximity to the recess, said member defining a container;
   explosive means contained within said deformable member; and
   means for detonating said explosive means to expand the deformable member, the expansion causing a seal to occur between the flange and the protection whereby the two are locked together and sealed in the recess area.

5. Latch-and-seal means as in claim 4, wherein:
   said flange is located between said deformable member and said recess.

6. Latch-and-seal means as in claim 4, wherein:
   said deformable member is located between said recess and said flange.

7. Latch-and-seal means as in claim 4, wherein:
   said flange is formed with a concavity which is in mating position with the recess in said projection.

8. Latch-and-seal means as in claim 4, wherein:
   said flange is formed with an annular, inwardly extending shoulder affixed to its axially forward end,
   said projection is formed with a surface at its radially outermost end, said surface being adjacent to the inner surface of said shoulder, said recess opening radially inwards from the radially outermost surface of said projection, the deformable means being attached to said inner surface of said shoulder and extending into said recess, whereby the explosive expansion of the deformable means causes it to fit tightly against the surface of the recess to form a locking seal therewith.

9. Latch-and-seal means, for two telescoping rocket engine nozzle sections, one being fixed and the other extendible, the latch-and-seal means for latching-and-sealing the front end of the extendible nozzle to the rear end of the fixed nozzle when the extendible nozzle is in its fully extended position, comprising:

an axially extending annular flange affixed to the front end of the extendible nozzle and having an inner surface;

a radially extending annular projection affixed to the rear end of the fixed nozzle and having an outer surface adjacent to the inner surface of the extendible nozzle, said projection being formed with an annular arcuate recess therein extending inward from said outer surface;

a deformable, metal, annular member in close proximity to said recess, said member defining a tubular, oval flattened container;

explosive means contained within said deformable member; and means for detonating said explosive means to expand the deformable member, the expansion causing a seal to occur between the flange and the projection whereby the two are locked together and sealed in the recess area.

10. Means as in claim 9, wherein:

the material from which said flange is formed is a strong, somewhat ductile material such as columbium, which is adapted by its ductility to make a tight fit, when explosively expanded, with the inside surface of said recess.

11. Latch-and-seal means as in claim 9, wherein:

said flange is located between said deformable member and said recess, said deformable member being affixed to said flange on the opposite side and in linear correspondence with said recess.

12. Means as in claim 11, wherein:

said deformable member is in the form of a flattened oval with its long axis pointing toward said recess.

13. Means as in claim 8, wherein:

said flange is integral with said extendible nozzle, and said projection is integral with said fixed nozzle.

14. Means as in claim 9, wherein:

said flange is formed with an annular concavity which is in mating position with the recess in said projection and said deformable member is located within the conduit formed by the concavity and the recess.

15. Means as in claim 9, wherein:

said deformable member is affixed to the inner surface of the flange and extends into said recess.

16. Means as in claim 9, wherein:

said flange is formed with an annular forwardly extending shoulder affixed to its radially outermost end, said protection being formed with a surface at its radially outermost end, said surface being adjacent to the inner surface of said shoulder.

said recess extending radially inwards from the radially outermost surface of said projection.

the deformable means being attached to said inner surface of said shoulder and extending into said recess, whereby the explosive expansion of the deformable means causes it to fit tightly against the surface of the recess to form a locking seal therewith.

* * * * *

UNITED STATES PATENT AND TRADEMARK OFFICE
CERTIFICATE OF CORRECTION

PATENT NO. : 4,682,779

DATED : Jul. 28, 1987

INVENTOR(S) : Robert A. Feight et al

It is certified that error appears in the above-identified patent and that said Letters Patent is hereby corrected as shown below:

Title page:

After "Inventor" add --Assignee: Rockwell International Corporation
El Segundo, Calif.--

Before "Abstract" add --Attorney, Agent, or Firm - H. Fredrick Hamann;
Harry B. Field --

Signed and Sealed this

Eighth Day of March, 1988

Attest:

DONALD J. QUIGG

Attesting Officer

Commissioner of Patents and Trademarks